United States Patent
Gehart

Patent Number: 5,871,259
Date of Patent: Feb. 16, 1999

[54] LINEAR SEAT-BACK RECLINER MECHANISM

[76] Inventor: John Gehart, 52638 Turnbury Ct., Shelby Township, Mich. 48315

[21] Appl. No.: 855,816

[22] Filed: May 12, 1997

[51] Int. Cl.$^6$ .................................................. B60N 2/02
[52] U.S. Cl. ................................ 297/362.12; 297/361.1
[58] Field of Search .......................... 297/362.12, 361.1, 297/366, 367; 74/575, 162; 267/168

[56] References Cited

U.S. PATENT DOCUMENTS

| | | | |
|---|---|---|---|
| 1,226,434 | 5/1917 | Zumwalt . | |
| 2,248,447 | 7/1941 | Wood . | |
| 3,356,411 | 12/1967 | Homier et al. | 297/362.12 |
| 4,118,020 | 10/1978 | Myers | 267/168 |
| 4,148,469 | 4/1979 | Geyer . | |
| 4,579,386 | 4/1986 | Rupp et al. | 297/362.12 |
| 4,907,788 | 3/1990 | Balsells . | |
| 5,482,261 | 1/1996 | Ortega | 267/168 |
| 5,618,083 | 4/1997 | Martone et al. | 297/362.12 X |
| 5,660,440 | 8/1997 | Pejathaya | 297/362.12 |

*Primary Examiner*—Milton Nelson, Jr.

[57] ABSTRACT

The linear seat-back recliner mechanism enables pivotal rotation of a seat back relative to a seat cushion in accordance with occupant request. The mechanism comprises an elongated recliner rod, an actuator mechanism, and a spring unit. The actuator mechanism is secured to the seat cushion. The recliner rod is pivotally retained relative to the seat back and slidingly engaged through the actuator mechanism, the spring unit being positioned between the seat-back frame and the actuator mechanism. The spring unit is disposed about the recliner rod, and includes an inner elongated compression spring nested within an outer elongated compression spring.

14 Claims, 5 Drawing Sheets

LINEAR SEAT-BACK RECLINER MECHANISM

FIELD OF USE

The present invention involves a linear seat-back recliner mechanism and, more particularly, a recliner mechanism that enables the adjusting and retaining the angular position of a seat back relative to a seat cushion in a motor vehicle, an aircraft, watercraft, home recliner, or other seating applications.

BACKGROUND OF THE INVENTION

There are many configurations for linear seat-back recliner mechanisms, including:

- U.S. Pat. No. 5,618,083 (Martone et al.) which discloses a linear seat-back recliner mechanism that is infinitely adjustable. The mechanism includes an elongated actuator rod that cooperatively engages with an actuator through interlocking serrations that enhance the gripping power of the mechanism.
- U.S. Pat. No. 5,338,100 (Rees) which discloses a high-strength seat frame recliner having a pair of seat track assemblies. The seat-back frame is cooperatively engaged with the lower recliner structure to insure compressive loading when subjected to frontal forces during impact, while permitting entry into the back seat for a two-door vehicle.
- U.S. Pat. No. 5,280,999 (Jones et al.) which discloses a manually actuated recliner mechanism having an infinitely-variable lead screw with a helical screw thread. A mechanism locks the lead screw to prevent unwanted rotation. Upon the selective release of the lock mechanism, axial forces applied to the lead screw enable angular adjustment of the seat back.
- U.S. Pat. No. 5,199,764 (Robinson) which discloses a power recliner including a master and a slave recliner mechanism. An integrally powered motor is mounted onto the master recliner mechanism. Each recliner mechanism includes a threaded recliner rod which prevents the forward withdrawal from the master recliner mechanism.
- U.S. Pat. No. 5,052,752 (Robinson) which discloses an infinitely adjustable recliner that enables continuously variable seat-back angular positioning. The mechanism includes a threaded recliner rod disposed within a coil spring. One end of the spring engages the housing assembly and the other end of the spring engages a secure projection of the rod. The spring urges the seat back to an upright position when the recliner mechanism is in a released state.
- U.S. Pat. No. 4,898,424 (Bell) which discloses a spring-loaded latch mechanism that controls the rotational repositioning of the seat back relative to the seat frame. The mechanism includes an elongated rod that is disposed within an elongated compression spring. The rod has a pair of abutment shoulders that engage the ends of the spring and inhibit the axial movement of the shoulders toward the latch frame but yield to forces transmitted by the occupant of the seat.

Long compression springs buckle when they are compressed. A guide rod is often inserted into the spring to prevent lateral movement of the spring. When the rod includes surface variations, such as steps, or teeth, noise occurs when the inner surface of the spring travels across these surface variations.

What is needed is an improved linear seat recliner that can be readily modified to accommodate various loading requirements by using multiple nested springs that can be positioned relative to each other according to operational demands.

What is needed is an improved linear seat recliner that uses conventional springs that are readily available that are low cost items, and that are easily assembled.

What is needed is an improved linear seat recliner having a relatively simple design that is compatible with a two-sided configuration, involving both a master and a slave unit having the same or similar parts in each unit that will simplify assembly and reduce costs.

What is needed is an improved linear seat recliner using springs that can be used in a wide variety of load environments that are readily interchangeable but will minimize buckling, and are essentially silent.

What is needed is an improved spring configuration for use with linear seat-back recliner mechanisms that eliminates tangling of the compression springs when they are transported in bulk.

What is needed is an improved linear seat recliner that is applicable to manual and power mechanisms, to light duty and heavy duty vehicles in additon to passanger cars, and provides high output What is needed is an improved linear seat recliner that is easy to assemble, that is reliable, that is lightweight, that can be adapted for use in motor vehicles, aircraft, watercraft, recliners, or any other similar seating application.

SUMMARY OF THE INVENTION

Briefly, the linear seat-back recliner mechanism of the present invention enables pivotal rotation of a seat back relative to a seat cushion, and will lock the seat back in position relative to the seat cushion in accordance with occupant demand.

The mechanism preferably comprises a master and a slave unit connected by either a power cable or torque transmission means. The master and the slave unit each comprise an elongated recliner rod, an actuator mechanism, and a spring unit.

The elongated recliner rod is pivotally retained relative to the seat back and a seat-back frame, and the rod extends through an actuator mechanism. The spring unit is disposed on the recliner rod between the actuator mechanism and the pivotal attachment to the seat-back frame.

A variety of spring units may be used to provide the necessary tensile forces. The spring unit may comprise two or more compression springs nested one inside the other. The spring unit may comprise a spring having reduced diameter coils that sandwich the larger diameter coils. The spring unit may also comprise larger diameter coils that sandwich smaller diameter coils.

For a more complete understanding of the linear seat-back recliner mechanism of the present invention, reference is made to the following detailed description and accompanying drawings in which the presently preferred embodiments of the invention are shown by way of example. As the invention may be embodied in many forms without departing from spirit of essential characteristics thereof, it is expressly understood that the drawings are for purposes of illustration and description only, and are not intended as a definition of the limits of the invention. Throughout the description, like reference numbers refer to the same component throughout the several views.

DETAILED DESCRIPTION OF THE PREFERRED EMBODIMENTS

Figure 1:
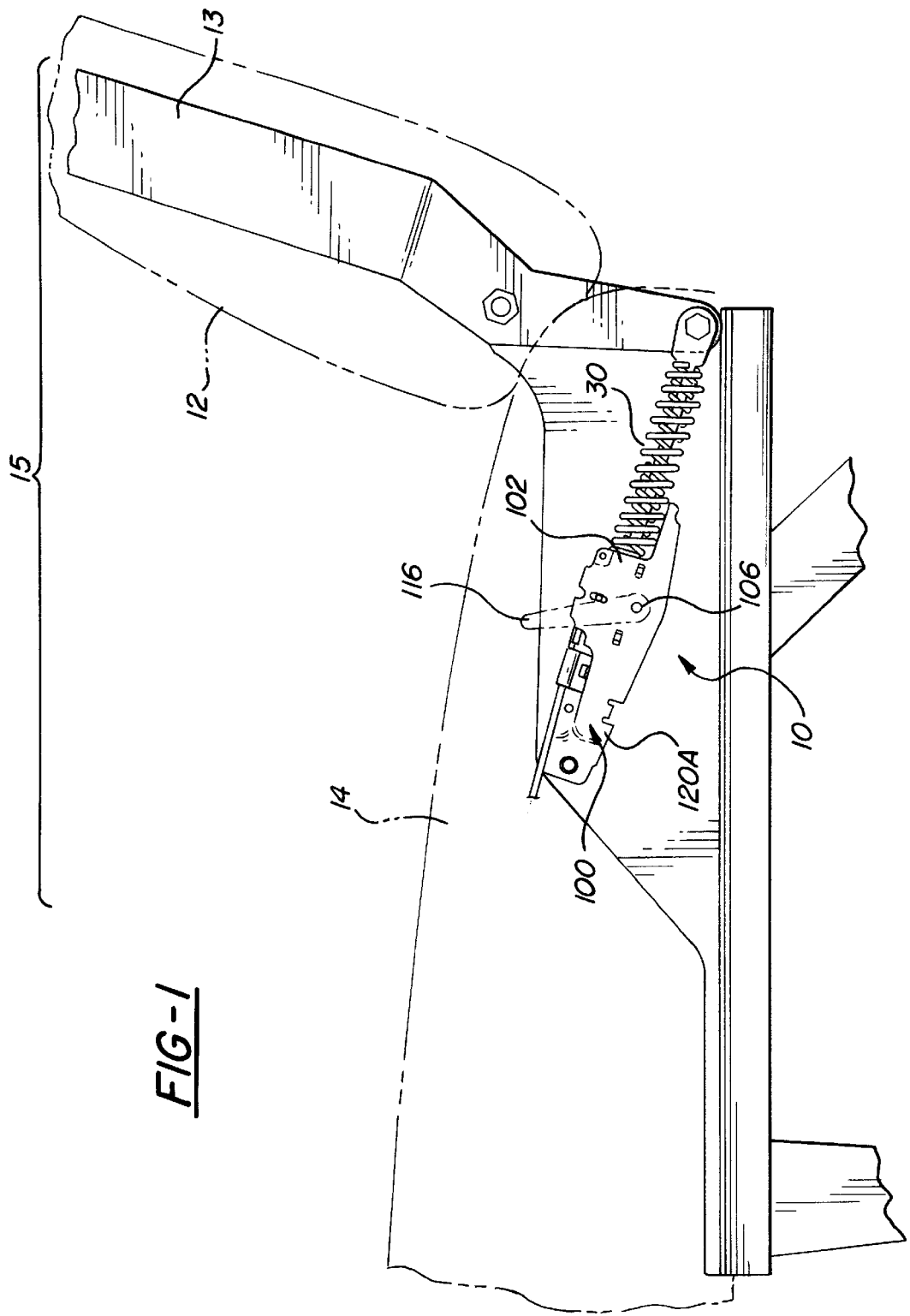
FIG. 1 is a side elevational view of a front seat assembly of a vehicle which includes a first embodiment of the linear seat-back recliner mechanism of the present invention.

Referring now to the drawings, FIG. 1 discloses a vehicle seat assembly [15] incorporating a linear seat-back recliner mechanism [10] in accordance with the present invention. The seat assembly [15] is of the type conventionally installed in the front passenger's compartment of motor vehicles. The assembly [15] includes a seat back [12] and a seat cushion [14], with the linear seat-back recliner mechanism [10] enabling the angle between the seat back [12] and the seat cushion [14] to be variably controlled in accordance with occupant demand.

A seat-back frame [13] is anchored to the seat back by conventional fasteners which enables the seat back [12] to rotate pivotally to a desired position relative to the seat cushion. The seat-back frame [13] is made of a relatively rigid material and is suitably configured to provide stable pivotal rotation upon the actuation of the recliner mechanism [10].

Figure 5A:
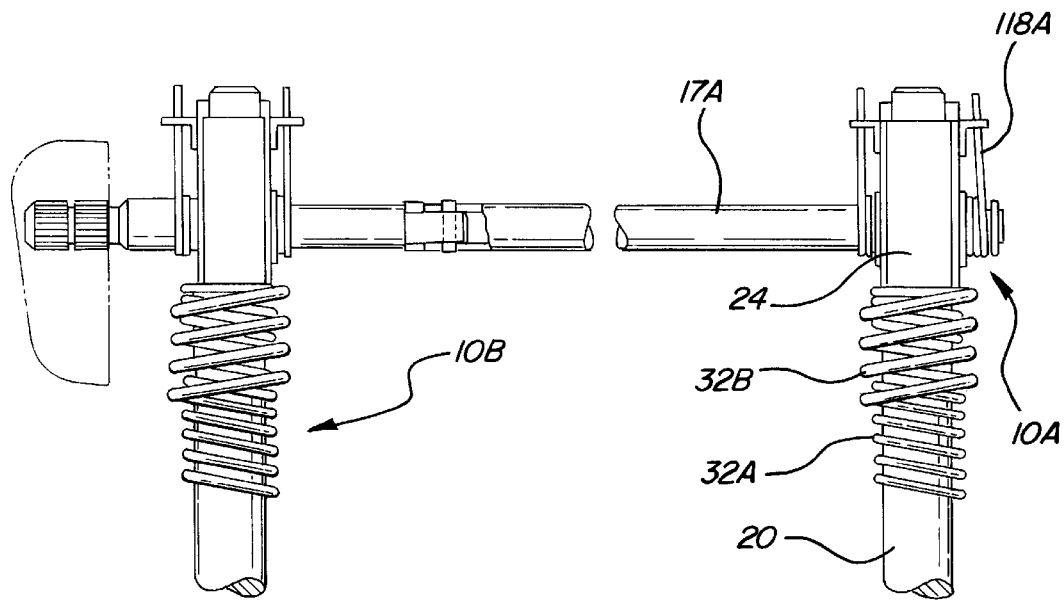
FIG. 5A is a plan view of the linear seat-back recliner mechanism of FIG. 1 having a configuration using both a master and a slave actuator mechanism joined by a pivot rod for transferring torques.
Figure 5B:
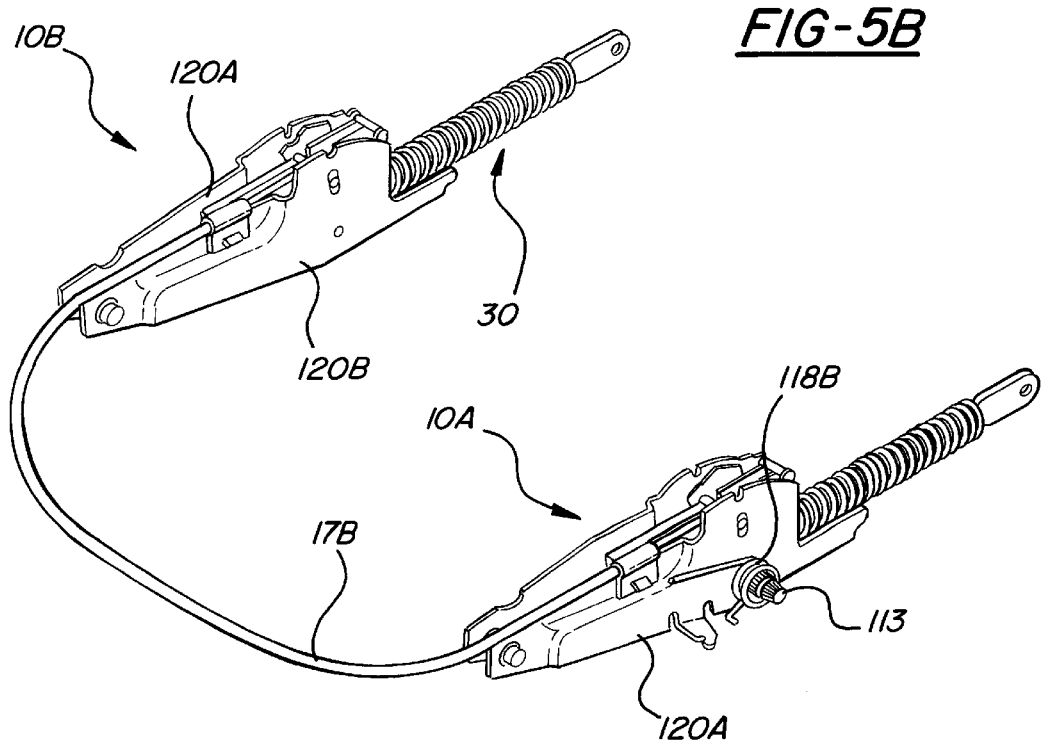
FIG. 5B is an isometric view of another embodiment having a master and a slave actuator mechanisms joined by a power cable.

The seat-back recliner mechanism [10] preferably comprises a master and a slave unit [10A and 10B] cooperatively engaged by either a mechanical means [17A] as seen in FIG. 5A, or a power cable [17B] as seen in FIG. 5B. The master-slave connection [17] enables torque to be transmitted from the master unit [10A] to the slave unit [10B]. The master unit [10A] and the slave unit [10B] each comprise an elongated recliner rod [20], an actuator mechanism [100], and a spring unit [30]. As is apparent from FIGS. 5A and 5B, the master unit [10A] includes many components that are common with or mirror images of those components on the slave unit [10B]. Also, the principles of the present invention are applicable to dual actuator mechanisms involving two units, only one of which has a spring unit providing the seat-back return force.

One end [24] of the elongated recliner rod [20] is pivotally retained relative to the seat back [12] and a seat-back frame [13]. The recliner rod [20] extends through the actuator mechanism [100]. Axial movement of the recliner rod [20] through the actuator mechanism and a limited range defines a range of angular movements of the seat back [12] relative to the seat cushion [14]. The actuator mechanism [100] releases the seat back [12] enabling a repositioning of the seat back [12] relative to the seat cushion [14] and enables the seat back [12] to lock in position relative to the seat cushion [14].

Figure 2:
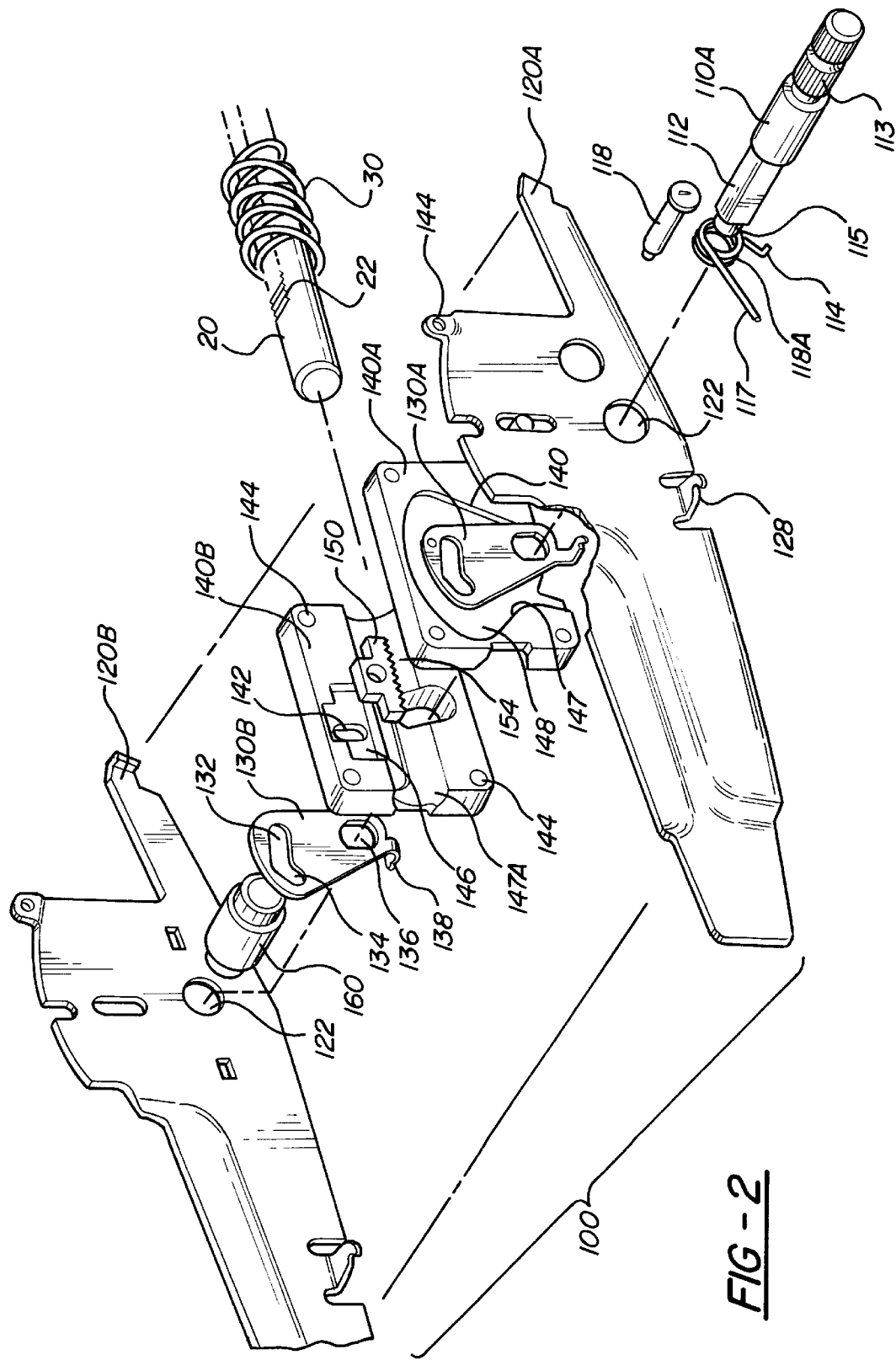
FIG. 2 is an assembly view of an actuator mechanism as used in the linear seat-back recliner mechanism of FIG. 1.
Figure 3:
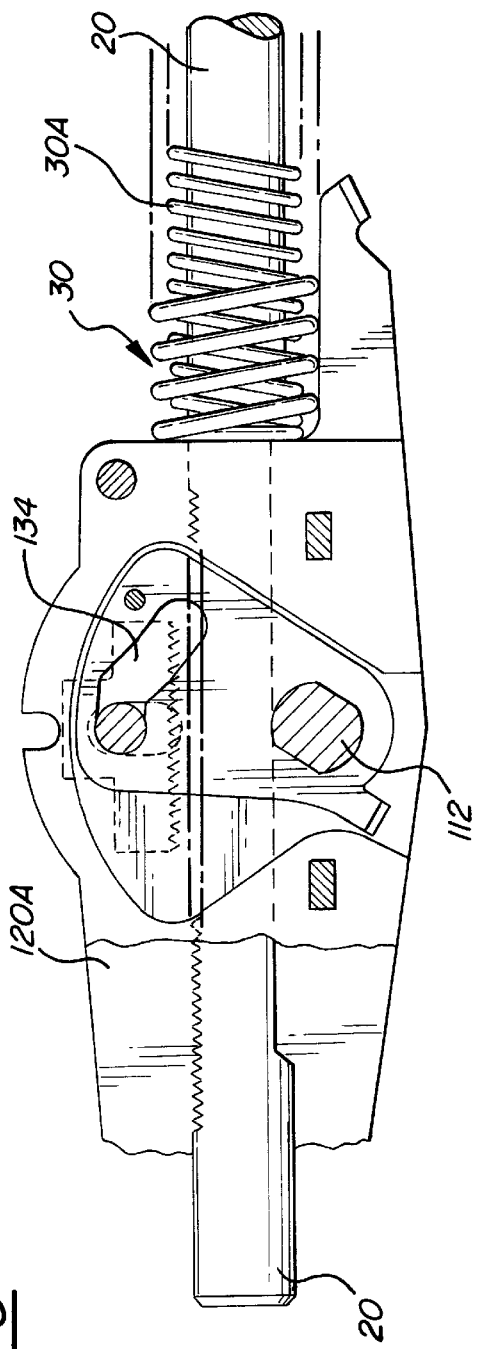
FIG. 3 is a partial elevational view of the actuator mechanism of FIG. 2 when in the seat-back reclined position.
Figure 4:
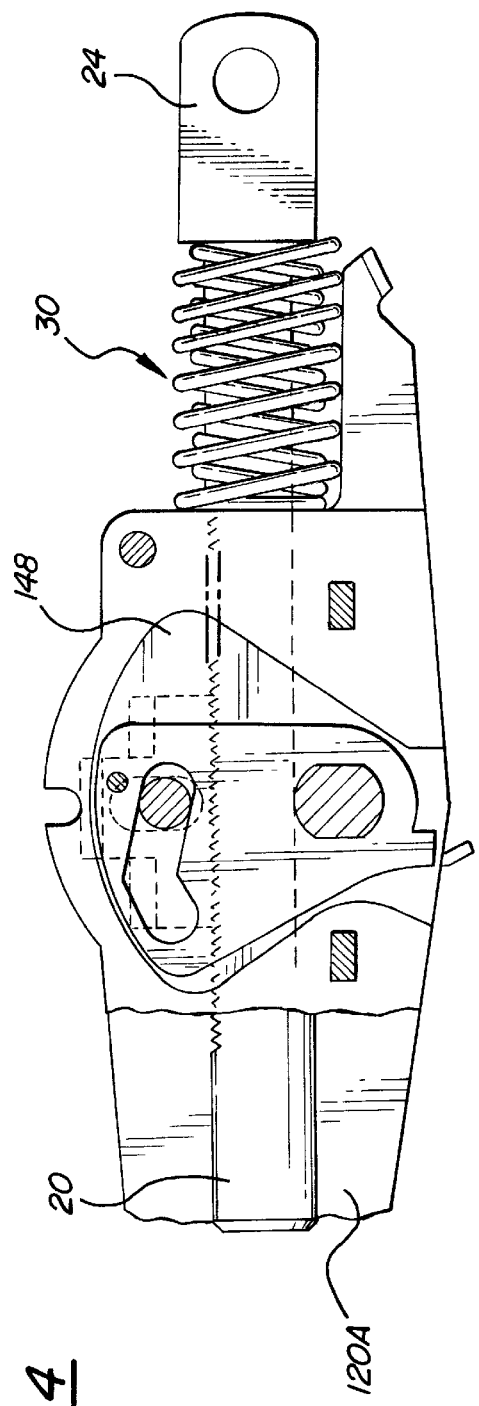
FIG. 4 is a partial elevational view of the actuator mechanism of FIG. 3 when in the seat-back up position.

FIG. 2 discloses the actuator mechanism [100] which is disposed within an actuator housing [102], which is generally rectangular and encases a pair of metal side plates [120A and 120B], a pair of plastic spacers [140A and 140B] with conventional fasteners (not shown) and rivet [160]. The plates [120A and 120B] and spacers [140A and 140B] include a plurality of apertures [144] for cooperative engagement with rivets (not shown) corresponding elongated slots sized to receive a pawl pin [118]. The elongated slots define a vertically extending cam slot [142]. Each rivet is cooperatively engaged through an aperture [144] to secure the spacers [140A and 140B] to the side plates [120A and 120B]. A rivet [160] engages through an aperture [122] and is a mounting tube for receiving a pin [106] to rotatably mount the mechanism to the seat frame. Each spacer [140A and 140B] has two faces and two recesses. The cylindrical recess [147A] formed between the spacers [140A and 140B] enables the recliner rod [20] to slide through during repositioning of the seat back [12]. Each first face is abutted whereby the first recesses define a generally inverted T-shaped cavity [146], having a pair of vertical sidewalls that define a channel for receiving the pawl [150]. Each side plate [120A and 120B] abuts one respective second face whereby the second recesses define a generally wedge-shaped cavity [148] having radial sidewalls [147 and 149] and which receives one cam plate. A bore is defined through the side plates [120A and 120B] and spacers [140A and 140B] by respective apertures therein being aligned, the bore being sized to receive a pivot rod [110A].

One end of the spring unit [30] abuts a flat portion [24] of the recliner rod [20] and the other end of the spring unit [30] abuts the actuator housing [102]. The spring unit [30] inhibits axial movement of the seat back toward the actuator housing [102], but yields to forces transmitted thereto by the occupant rotating the seat back.

The cam plates [130A and 130B] are wedge-shaped, generally flat, and include an elongated slot at its narrowest apex to define a keyway [136], an arcuate slot [132] defining a cam follower surface [134] and a notched spring retainer flange [138] extending upwardly therefrom so as to extend outwardly of the side plate it confronts. The cam plates [130A and 130B] are adapted to rotate between [147 and 149] defined by the cavity [148] into which it is fit. The cam follower surface [134] has arcuate first and second portions spaced radially outward from keyway [136] to engage and thereby drive pawl pin [118].

The pawl [150] is a generally inverted T-shaped. The bottom portion of the pawl [150] has teeth [154] that cooperatively engage teeth [22] on the recliner rod [20]. In turn, the actuator mechanism is pivotally secured to the seat cushion.

The body portion of the pawl [150] is adapted to reciprocate in the channel in a vertical plane relative to the recliner rod [20]. A cylindrical aperture [156] in its body portion is aligned with the oval shaped cam slot [142] and is sized to receive pawl pin [118].

Pivot rod [110A] has a flat [112] and extends through bore [122]. The cross section of the rod [110A] defines a key which fits in the keyways [136] of cam plates [130A and 130B] to prevent rotation of the cam plates [130A and 130B]. The pivot rod [110A] has opposing end portions [113 and 115] each respective end portion extending outwardly from one respective side plate. Rod end [113] extends away from the seat and being connected to manually operated handle [116] and rod end [115] extends toward the seat.

A coil torsion spring [118A] is adjacent each side plate and fits above pivot pin [110A]. Each torsion spring [118A] has one end [117] abutting a respective side flange [128] in side plate [120A] and its other end [119] being received in a notch of the cam plate spring retainer flange [138]. The torsion springs [118A] inhibit rotation of the respective cam plates [130A and 130B].

Pawl pin [118] has a circular cross section and extends through aperture [156] in pawl [150], and through the squared cam slots [142] formed in side plates [120A and 120B] and spacers [140A and 140B]. A cam slot [142] restrains a pawl pin [152], for vertical movement relative to the actuator as a result of rotation of the cam plates [130A and 130B] by the pivot rod [110A]. Pawl pin [118] fits into the arcuate slot [132] and is engaged by cam follower [134]. Rotation of the cam plates [130A and 130B] cause the follower surfaces to drive the pin vertically relative to the cam slot [142], removing engagement between the pawl teeth [154] with the teeth [22] on the recliner rod [20].

The actuator mechanism [100] may also be similar either to the mechanism shown in U.S. Pat. No. 4,898,424 or U.S. Pat. No. 5,052,752, both Patents being incorporated by reference into this specification.

Figure 7:
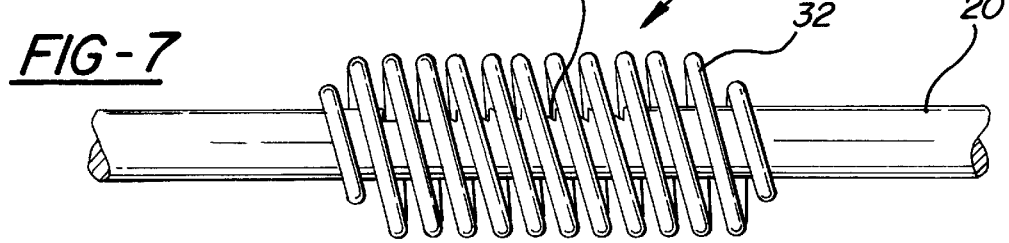
FIG. 7 shows the compression spring of FIG. 6 in the compressed condition with respect to the recliner rod having surface irregularities.
Figure 8:
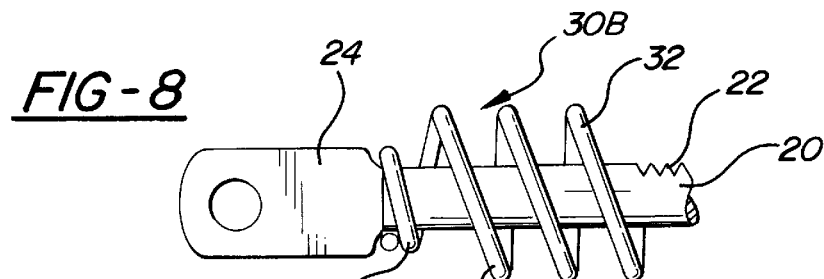
FIG. 8 shows a variation of the spring unit relative to a recliner rod, the spring and the recliner rod being components of the linear seat-back recliner mechanism of the present invention.
Figure 9:
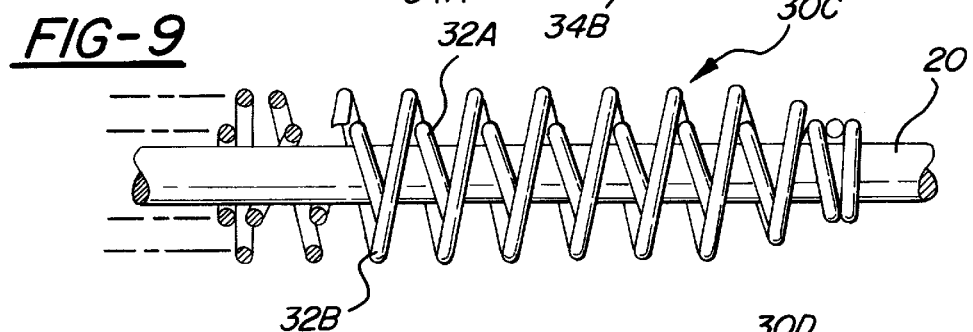
FIG. 9 shows another variation of the spring unit relative to a recliner rod, the spring and the recliner rod being components of the linear seat-back recliner mechanism of the present invention.
Figure 10:
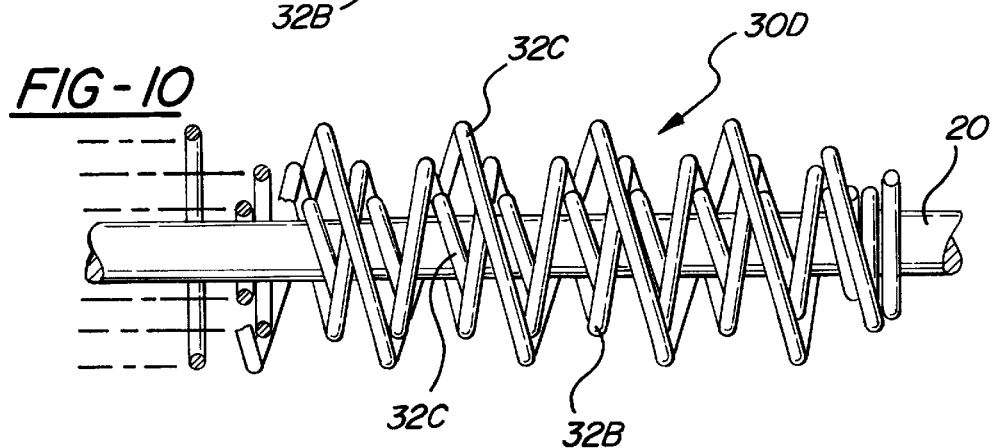
FIG. 10 shows yet another variation of the spring unit relative to a recliner rod, the spring and the recliner rod being components of the linear seat-back recliner mechanism of the present invention.

A variety of spring units [30] may be used to provide the necessary tensile forces. FIG. 9 depicts another embodiment of the spring unit [30C] of the present invention comprising two compression springs [32A and 32B] nested one inside the other. FIG. 10 depicts another embodiment of the spring unit [30D] of the present invention comprising three compression springs other [32A, 32B, and 32C] nested one inside the other. The spring unit [30] may comprise a spring having reduced diameter coils that sandwich the larger diameter coils (see FIGS. 6 and 7). FIG. 8 shows another embodiment of a spring unit [30B] and recliner rod [20] of the present invention, wherein one end of the spring unit [32] has a reduced coil and abuts one end [24] of the recliner rod [20] that is secured to the seat back. The spring unit [30] may also comprise larger diameter coils that sandwich smaller diameter coils. And finally the spring unit [30] may comprise multiple nested springs, whereby the inner spring has coils of varying diameters.

An elongated cylindrical recliner rod [20] is disposed inside the spring units to prevent buckling. The recliner rod [20] includes a flat end [22] that is pinned to the seat-back frame [13], which enables rotation of the seat back [12] relative to the seat cushion [14].

The spring unit [30] comprises one or more annular compression springs disposed between the flat end [22] of the recliner rod [20] and the actuator mechanism [100], as hereinafter described.

The spring unit [30] is fully compressed when the seat back [12] is in the extreme reclined position. When moved forward from the fully reclined position the actuator releases engagement and the spring unit [30] forces the seat back [12] forward moving the recliner rod [20] upwardly.

It is appreciated that significant advantage can be achieved by combining multiple springs, since it will require a higher spring force to achieve the same deflection as can be achieved with a single spring in the same envelope or package. FIG. 9 shows a spring unit having dual nested springs, and FIG. 10 shows a spring unit having triple nested springs.

When two or more springs are nested together, the slopes of the coils of adjacent springs are preferably in opposite directions. The inner spring coils may have smaller and larger diameter coils, to minimize noise during compression or to eliminate the need for end stops or washers as discussed below. The nested compression springs are fully compressed in the reclined position, and are in any one of many partially compressed conditions when the seat back is in all other positions.

Also, open coil springs often become entangled together when transported in bulk. This tangling can be eliminated by nesting and securing two or more springs together. The nested springs are secured together by twisting a smaller diameter spring into a larger diameter spring that has reduced end coils. The springs will not become entangled if the direction of the wind is opposite in adjacent springs.

Figure 6:
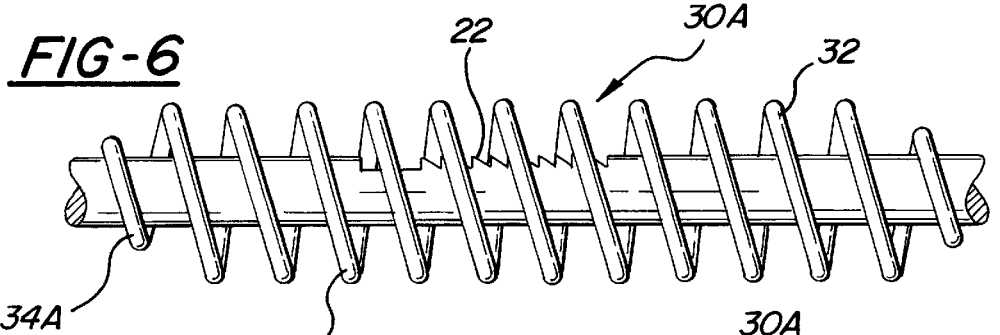
FIG. 6 shows a compression spring in the expanded condition with respect to a recliner rod having surface irregularities, the spring and the recliner rod being components of the linear seat-back recliner mechanism of the present invention.

Noise involving the spring unit [30] can be significantly reduced by varying the diameter of the springs at selected locations at one or more locations along the length of the spring. The recliner rod [20] may include surface irregularities [22], such as notches or teeth as seen in FIGS. 6 and 7. This feature is especially significant if multiple nested springs are used, since the inner spring [32A] serves as a guide for the outer spring [32B].

As used herein, the term "mean diameter" is the outer diameter of the coil less the wire diameter. A spring having a lower spring rate is used when a larger wire diameter is used in conjunction with a greater mean diameter. When there is not enough room for a conventional compression spring, increased spring outputs can be achieved at intermediate positions by using a spring [32A] with a lower spring rate. This can be accomplished by using a spring [32A] having reduced end coil diameters, and a larger average mean diameter.

By using a spring having reduced coils [34A] on the ends sandwiching larger diameter coils [34B], it becomes unnecessary to use components such as flat washers or stops.

As shown in FIG. 1, the master unit [10A] includes a handle [116] for manual operation, generally positioned on the outboard side of the driver's seat. If the driver and the front-seat passenger have bucket seats or the like, each seat would include a handle [116] on the respective outboard sides thereof.

While the embodiment shown herein utilizes a manual actuator mechanism [100], the principles of this invention are equally applicable to a power actuator mechanism, or a dual actuator mechanism. Further, it is appreciated that in some seats, in many applications only a single linear seat-back recliner mechanism [10] may be needed rather than using a master and a slave unit [10A and 10B].

It is evident that many alternatives, modifications, and variations of the linear seat-back recliner mechanism [10] of the present invention will be apparent to those skilled in the art in light of the disclosure herein. It is intended that the metes and bounds of the present invention be determined by the appended claims rather than by the language of the above specification, and that all such alternatives, modifications, and variations which form a conjointly cooperative equivalent are intended to be included within the spirit and scope of these claims.

I claim:

1. A linear seat-back recliner mechanism enabling pivotal rotation of a seat-back relative to a seat cushion in accordance with occupant demand, the mechanism comprising:

an elongated recliner rod adapted for pivotal retention with the seat-back and a seat-back frame, the recliner rod extending through an actuator housing;

an actuator mechanism disposed within the actuator housing, the actuator mechanism adapted to release the seat-back enabling a repositioning of the seat-back relative to the seat cushion in accordance with occupant demand, the actuator mechanism adapted to lock the seat-back into position relative to the seat cushion in accordance with occupant demand; and a spring unit disposed about the elongated recliner rod, the spring unit comprising an outer elongated compression spring having a cavity disposed therein, and an inner elongated compression spring having a smaller diameter than the outer spring, the inner spring being nested within the cavity of the outer spring.

2. A linear seat-back recliner mechanism enabling pivotal rotation of a seat-back relative to a seat cushion in accordance with occupant demand, the mechanism comprising:

an elongated recliner rod adapted for pivotal retention with the seat-back and a seat-back frame, the recliner rod extending through an actuator housing, the elongated recliner rod having surface irregularities;

an actuator mechanism disposed within the actuator housing, the actuator mechanism adapted to release the seat-back enabling a repositioning of the seat-back relative to the seat cushion in accordance with occupant demand, the actuator mechanism adapted to lock the seat-back into position relative to the seat cushion in accordance with occupant demand; and a compression spring being disposed about the elongated recliner rod, the spring having smaller diameter coils and larger diameter coils, the spring having a first and a second position relative to the seat-back frame, the larger diameter coils being adjacent the surface irregularities on the recliner rod when the seat-back is in the first position, the larger diameter coils being adjacent the surface irregularities on the recliner rod when the seat-back is in the second position.

3. A linear seat-back recliner mechanism enabling pivotal rotation of a seat-back relative to a seat cushion in accordance with occupant demand, the mechanism comprising:

an elongated recliner rod adapted for pivotal retention with the seat-back and a seat-back frame, the recliner rod extending through an actuator housing;

an actuator mechanism disposed within the actuator housing, the actuator mechanism adapted to release the seat-back enabling a repositioning of the seat-back relative to the seat cushion in accordance with occupant demand, the actuator mechanism adapted to lock the seat-back into position relative to the seat cushion in accordance with occupant demand; and a compression spring disposed about the recliner rod, the compression spring including a plurality of first coils having a first spring diameter and a plurality of second coils having a second spring diameter, the first coils sandwiching the second coils.

4. The linear seat-back recliner mechanism of claim 3, wherein the first coils have a larger spring diameter than the second coils.

5. The linear seat-back recliner mechanism of claim 3, wherein the first coils have a smaller spring diameter than the second coils.

6. A linear seat-back recliner mechanism enabling pivotal rotation of a seat-back relative to a seat cushion in accordance with occupant demand, the mechanism comprising:

an elongated recliner rod adapted for pivotal retention with the seat-back and a seat-back frame, the recliner rod extending through an actuator housing;

an actuator mechanism disposed within the actuator housing, the actuator mechanism adapted to release the seat-back enabling a repositioning of the seat-back relative to the seat cushion in accordance with occupant demand, the actuator mechanism adapted to lock the seat-back into position relative to the seat cushion in accordance with occupant demand; and a spring unit which includes at least one compression spring, the spring unit being disposed about the recliner rod, the spring unit comprising a plurality of inner coils having an inner mean diameter and a plurality of outer coils having an outer mean diameter, the inner coils being disposed interior to the outer coils, the inner mean diameter being different from the outer mean diameter.

7. The linear seat-back recliner mechanism of claim 6, wherein two compression springs are nested one inside the other, the inner spring having a substantially uniform diameter.

8. The linear seat-back recliner mechanism of claim 6, wherein two compression springs are nested one inside the other, the inner spring having a plurality of first coils having a larger spring diameter and a plurality of second coils having a smaller spring diameter, the larger coils sandwiching the smaller coils.

9. The linear seat-back recliner mechanism of claim 6, wherein two compression springs are nested one inside the other, the inner spring having a plurality of first coils having a smaller spring diameter and a plurality of second coils having a larger spring diameter, the smaller coils sandwiching the larger coils.

10. The linear seat-back recliner mechanism of claim 6, wherein two compression springs are nested one inside the other, the outer spring having a plurality of coils having a smaller spring diameter disposed at one end and a plurality of coils having a larger spring diameter disposed at the other end, the inner spring having coils of substantially uniform diameter.

11. The linear seat-back recliner mechanism of claim 6, wherein more than two compression springs are each nested one inside the other.

12. The linear seat-back recliner mechanism of claim 6, wherein one compression spring having larger diameter coils is sandwiched between smaller diameter coils, one end of the compression spring with the reduced diameter coils abutting one end of the recliner rod that is secured to the seat-back.

13. The linear seat-back recliner mechanism of claim 6, wherein one compression spring having larger diameter coils is sandwiched between smaller diameter coils, the middle of the spring unit having the larger diameter coils being adjacent to notches in the recliner rod to reduce noise.

14. The linear seat-back recliner mechanism of claim 6, wherein one compression spring having smaller diameter coils is sandwiched between larger diameter coils.

* * * * *